(12) United States Patent
Fathololoumi et al.

(10) Patent No.: US 11,973,539 B2
(45) Date of Patent: Apr. 30, 2024

(54) OPTICAL TRANSCEIVERS WITH MULTI-LASER MODULES

(71) Applicant: Intel Corporation, Santa Clara, CA (US)

(72) Inventors: Saeed Fathololoumi, Los Gatos, CA (US); Ling Liao, Fremont, CA (US); Quan Tran, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 107 days.

(21) Appl. No.: 17/696,174

(22) Filed: Mar. 16, 2022

(65) Prior Publication Data

US 2022/0209869 A1 Jun. 30, 2022

Related U.S. Application Data

(63) Continuation of application No. 16/984,437, filed on Aug. 4, 2020.

(51) Int. Cl.
*H04B 10/00* (2013.01)
*H04B 10/50* (2013.01)
*H04B 10/508* (2013.01)
*H04J 14/00* (2006.01)

(52) U.S. Cl.
CPC ....... *H04B 10/5053* (2013.01); *H04B 10/506* (2013.01); *H04B 10/508* (2013.01)

(58) Field of Classification Search
CPC .... H04B 10/03; H04B 10/032; H04B 10/035; H04B 10/038
See application file for complete search history.

(56) References Cited

U.S. PATENT DOCUMENTS

2018/0294621 A1\* 10/2018 Schrans ............... H04B 10/564
2019/0205285 A1\* 7/2019 Nagarajan ........... H04L 27/0008
2020/0249395 A1 9/2020 Pezeshki et al.

\* cited by examiner

*Primary Examiner* — Daniel G Dobson
(74) *Attorney, Agent, or Firm* — Akona IP PC (57) ABSTRACT

Disclosed herein are optical transceivers with multi-laser modules, as well as related optoelectronic assemblies and methods. In some embodiments, an optical transceiver may include: a first laser and a second laser; an optical output path, wherein an output of the first laser is coupled to the optical output path; and switching circuitry to decouple the output of the first laser from the optical output path and to couple an output of the second laser to the optical output path.

39 Claims, 4 Drawing Sheets

OPTICAL TRANSCEIVERS WITH MULTI-LASER MODULES

CROSS REFERENCE TO RELATED APPLICATIONS

This application is a continuation of and claims the benefit of priority under 35 U.S.C. § 120 from U.S. application Ser. No. 16/984,437, filed Aug. 4, 2020, and entitled OPTICAL TRANSCEIVERS WITH MULTI-LASER MODULES, the disclosure of which is hereby incorporated by reference herein in its entirety.

BACKGROUND

Electronic devices configured for optical communication may send information by encoding that information in light pulses transmitted over an appropriate medium. Reading of such information is performed by detecting and decoding incoming pulses.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, not by way of limitation, in the figures of the accompanying drawings.

DETAILED DESCRIPTION

Disclosed herein are optical transceivers with multi-laser modules, as well as related optoelectronic assemblies and methods. In some embodiments, an optical transceiver may include: a first laser and a second laser; an optical output path, wherein an output of the first laser is coupled to the optical output path; and switching circuitry to decouple the output of the first laser from the optical output path and to couple an output of the second laser to the optical output path.

In optical communication settings, lasers are often the components that are most likely to fail during fabrication or during the lifetime of the device. Efforts to improve the reliability of an individual laser may be adequate for low channel count devices, but as the channel count increases, the cascading failure rates of many individual lasers may yield a device failure-in-time (FIT) rate that is unacceptably high. Further, separating a laser from the rest of the components of an optical transceiver so that the laser may be selectively repaired or replaced may require additional optical coupling components (such as polarization maintaining fibers) that increase optical loss, requiring high laser output powers (and thus higher power consumption and possibly increased laser degradation), and that also increase the cost and complexity of manufacturing.

Various ones of the embodiments disclosed herein may include redundant lasers that can be tested and switched appropriately during manufacturing (to increase yield) and/or during device lifetime (to reduce the device FIT rate). Such embodiments may enable highly integrated optical transceivers that can accommodate large numbers of high-speed channels with high reliability and low device FIT without incurring the cost of significant design and/or manufacturing complexity. Some embodiments may include redundant semiconductor optical amplifiers (SOAs) instead of or in addition to redundant lasers.

In the following detailed description, reference is made to the accompanying drawings that form a part hereof wherein like numerals designate like parts throughout, and in which is shown, by way of illustration, embodiments that may be practiced. It is to be understood that other embodiments may be utilized, and structural or logical changes may be made, without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The phrase "A or B" means (A), (B), or (A and B). The drawings are not necessarily to scale.

Although many of the drawings illustrate rectilinear structures with flat walls and right-angle corners, this is simply for ease of illustration, and actual devices made using these techniques will exhibit rounded corners, surface roughness, and other features.

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. As used herein, a "package" and an "IC package" are synonymous. When used to describe a range of dimensions, the phrase "between X and Y" represents a range that includes X and Y. For convenience, the phrase "FIG. 4" may be used to refer to the collection of drawings of FIGS. 4A-4B.

Figure 1:
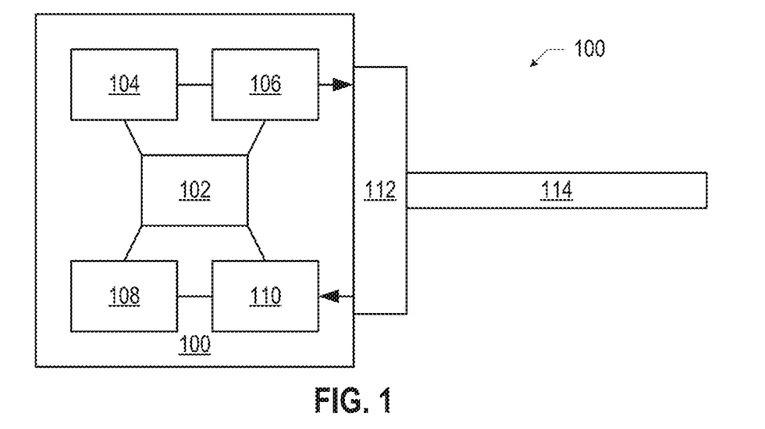
FIG. 1 is a block diagram of an optical transceiver with a multi-laser module, in accordance with various embodiments.

FIG. 1 is a block diagram of an optical transceiver 100 with a multi-laser module 104, in accordance with various embodiments. The multi-laser module 104 and modulator circuitry 106 may be part of an output path of the optical transceiver 100, and an input path of the optical transceiver 100 may include detector circuitry 110 and demodulator circuitry 108. Optical signal circuitry 102 may be communicatively coupled to the multi-laser module 104, the modulator circuitry 106, the detector circuitry 110, and the demodulator circuitry 108, and may provide signals to these components (and receive signals from these components) to monitor and control their operation.

The output and input paths of the optical transceiver 100 may be coupled to a fiber optic cable connector 112, which may in turn be coupled to a fiber optic cable 114. During operation, under the control of the optical signal circuitry 102, the multi-laser module 104 may generate laser light that may be modulated by the modulator circuitry 106 into light pulses that encode desired transmit information, which may then be output onto the fiber optic cable 114 via the fiber optic cable connector 112. Additionally, under the control of the optical signal circuitry 102, photodetectors of the detector circuitry 110 may receive light pulses that encode desired receive information (via the fiber optic cable and the fiber optic cable connector 112), and signals generated by the detector circuitry 110 in response to these received light pulses may be demodulated by demodulator circuitry 108. The modulator circuitry 106 and the demodulator circuitry 108 may perform additional functions; for example, in some embodiments, the modulator circuitry 106 may include multiplexer circuitry to multiplex light signals of different channels, while the detector circuitry 110 may include demultiplexer circuitry to demultiplex light signals of different channels.

Figure 2:
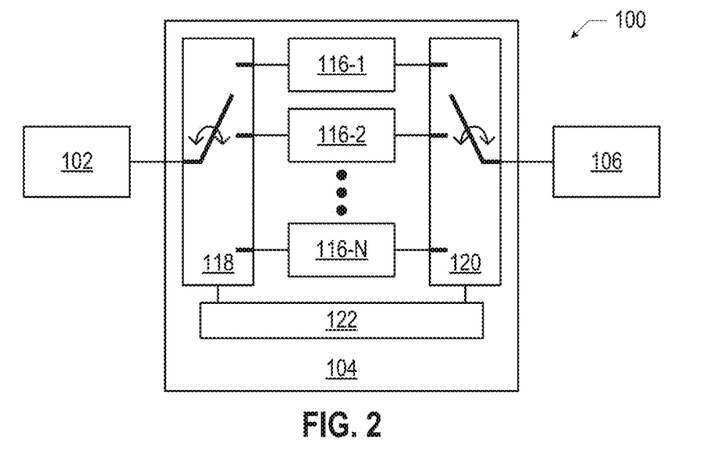
FIG. 2 is a block diagram of an example multi-laser module that may be included in an optical transceiver, in accordance with various embodiments.

The multi-laser module 104 may include two or more lasers 116 arranged so that the output of one of the lasers 116 may be selectively coupled to the output path of the optical transceiver 100. For example, FIG. 2 is a block diagram of an example multi-laser module 104 that may be included in an optical transceiver 100, in accordance with various embodiments. A multi-laser module 104 may include N lasers 116, where N is greater than or equal to 2. The outputs of the lasers 116 may be coupled to switching circuitry 120, and the output of the switching circuitry 120 may be coupled to the modulator circuitry 106. The switching circuitry 120 may be controlled by switch control circuitry 122; in particular, the switch control circuitry 122 may send control signals to the switching circuitry 120 to reconfigure the switching circuitry 120 to change which laser 116 will have its output coupled to the modulator circuitry 106. In some embodiments, the switch control circuitry 122 may include integrated or discrete photodetectors that may be used to monitor the performance of the lasers 116 to enable the switch control circuitry 122 to make switching decisions, as discussed further below. The laser 116 whose output is coupled to the modulator circuitry 106 via the switching circuitry 120 may be referred to herein as the "active" laser 116. In some embodiments, only one of the lasers 116 in a multi-laser module 104 may have its output coupled to the modulator circuitry 106 at any particular time; the active laser 116 may also be the only laser 116 of the multi-laser module 104 that is powered at that particular time (with power to the different ones of the lasers 116 controlled by, e.g., the optical signal circuitry 102, as discussed below).

Any suitable lasers 116 may be included in a multi-laser module 104. For example, a laser 116 included in a multi-laser module 104 may be a hybrid silicon laser who structure includes a silicon portion and an indium phosphide portion bonded to the silicon portion.

In some embodiments, an output from the optical signal circuitry 102 may be coupled to switching circuitry 118, and the output of the switching circuitry 118 may be coupled to the inputs to the lasers 116 (e.g., power signals for the lasers 116). The switching circuitry 118 may be controlled by switch control circuitry 122; in particular, the switch control circuitry 122 may provide signals to the switching circuitry 118 to reconfigure the switching circuitry 118 to change which laser 116 will be powered in accordance with the output from the optical signal circuitry 102. In some embodiments, the laser 116 whose input is coupled to the optical signal circuitry 102 via the switching circuitry 118 may be the only laser 116 of the multi-laser module 104 that is powered at any particular time. Powering only a single laser 116 in a group of laser 116 included in a multi-laser module 104 may allow the multi-laser module 104 to not incur any additional power consumption relative to conventional single-laser modules. Further, positioning the lasers 116 so that the "additional" lasers 116 in a multi-laser module 104 are located in the empty space that would typically be left between adjacent conventional single-laser modules allows the multi-laser modules 104 disclosed herein to be implemented without increasing the footprint of the multi-laser modules 104 relative to conventional single-laser modules until the empty space is filled.

In some embodiments, the switch control circuitry 122 may be configured to control the switching circuitry 118/120 to change which of the lasers 116 is the active laser 116 at any particular time. In some embodiments, changing which of the lasers 116 is the active laser 116 may be based on the detection of a failure or other compromised performance of the currently active laser 116 (e.g., by utilizing one or more photodetectors included in the switch control circuitry 122 to monitor the output of the currently active laser 116). For example, if the laser 116-1 is the active laser 116, the switch control circuitry 122 may be configured to detect a failure of the laser 116-1 (e.g., when in an automatic current control mode, by monitoring the power consumed by the laser 116-1 and observing the power consumption to drop below a threshold value at a particular bias current provided to the laser 116-1 in an automatic current control mode; or, in an automatic gain control mode, by observing the bias current provided to the laser 116-1 exceed a predetermined maximum limit value), and upon detection of that failure, control the switching circuitry 118/120 to make the laser 116-2 the active laser 116. In embodiments in which a multi-laser module 104 includes more than two lasers 116, this failure detection operation may be repeated until all lasers 116 in a multi-laser module 104 have failed.

Figure 3:
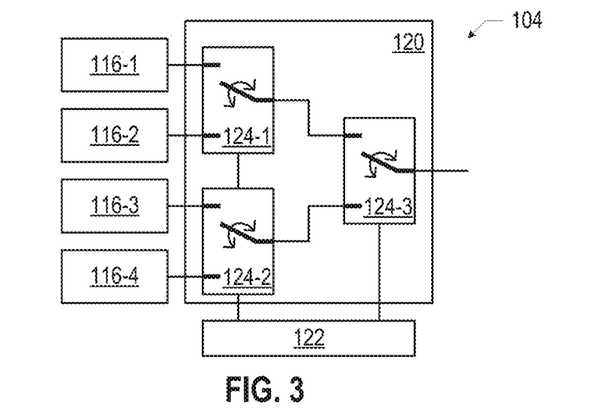
FIG. 3 is a block diagram of a portion of an example multi-laser module, in accordance with various embodiments.

In some embodiments, the switching circuitry 118 and/or the switching circuitry 120 may include a cascade of switches. For example, FIG. 3 is a block diagram of a portion of an example multi-laser module 104, in accordance with various embodiments. The multi-laser module 104 of FIG. 3 includes four lasers 116, and the switching circuitry 120 includes a cascade of multiple switches 124. In particular, the switch 124-1 may switch between the outputs of the lasers 116-1 and 116-2, the switch 124-2 may switch between the outputs of the lasers 116-3 and 116-4, and the switch 124-3 may switch between the outputs of the switches 124-1 and 124-2. The output of the switch 124-3 may thus represent the output of one of the four lasers 116 of FIG. 3. In some embodiments, a multi-laser module 104 may generate multiple laser outputs instead of a single laser output; for example, in an embodiment of the multi-laser module 104, the switch 124-3 may be omitted, and thus the switching circuitry 120 may provide two outputs, one corresponding to the output of the switch 124-1 (the output of the laser 116-1 or the laser 116-2) and the other corresponding to the output of the switch 124-2 (the output of the laser 116-3 or the laser 116-4). For example, in some embodiments, a multi-laser module 104 may have eight channels of output (corresponding to eight different groups of multiple lasers 116 that may be switched between); in another example, a multi-laser module 104 may have 256 channels of output (corresponding 256 different groups of multiple lasers 116 that may be switched between). In some embodiments, multiple ones of the lasers 116 included in a multi-laser module 104 may be spatially arranged linearly, as illustrated in FIG. 3, with groupings of adjacent lasers 116 corresponding to a particular switch 124. For example, in FIG. 3, the lasers 116-1 and 116-2 are adjacent to each other and both correspond to the switch 124-1; further, the lasers 116-3 and 116-4 are adjacent to each other and both correspond to the switch 124-2. The embodiments discussed herein with reference to the switching circuitry 120 of FIG. 3 may also be analogously applied to embodiments of the switching circuitry 118.

Although the switches 124 illustrated in FIG. 3 are two-to-one switches, any suitable switches 124 may be included in switching circuitry 120. In some embodiments, the switches 124 included in switching circuitry 120 may include Mach-Zehnder switches (also referred to as Mach-Zehnder interferometer switches). In such embodiments, the phase of the arms of a Mach-Zehnder switch may be controlled using a thermal phase tuner, a carrier injection-based tuner, a thermal memory material, or any other suitable control technique. When a 1×2 splitter is used at the output, a phase of $-\pi/2$ or $\pi/2$ may be used in each arm to select the appropriate laser 116. When a 2×2 splitter is used at the output, phase shifts of 0 and $\pi$ may be used to select the appropriate laser 116.

Figure 4A:
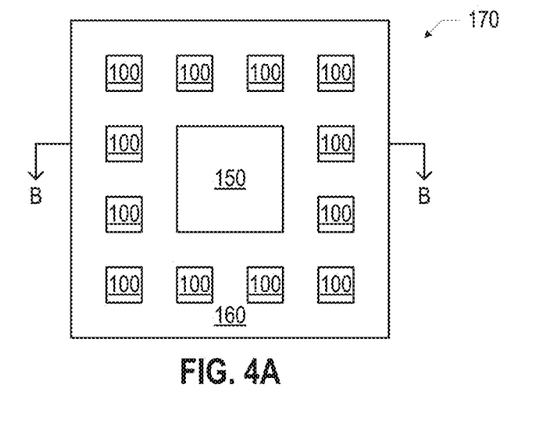
FIGS. 4A-4B are various views of an optoelectronic assembly including optical transceivers with multi-laser modules, in accordance with various embodiments.
Figure 4B:
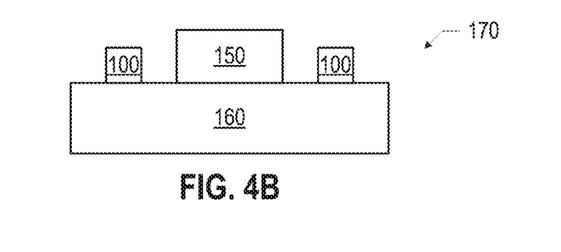

In some embodiments, an optical transceiver 100 that includes one or more multi-laser modules 104 may be part of an optoelectronic assembly 170. For example, FIG. 4 illustrates an optoelectronic assembly 170 including multiple optical transceivers 100, each of which may include one or more multi-laser modules 104. FIG. 4A is a top view of the optoelectronic assembly 170, while FIG. 4B is a side view of the optoelectronic assembly 170 (through the section B-B of FIG. 4A). The optoelectronic assembly 170 may include a network switch 150 (or other high-bandwidth application specific integrated circuit (ASIC), for example) and multiple optical transceivers 100 co-packaged with and arranged around the network switch 150. In some embodiments, the network switch 150 may be an ethernet switch. The network switch 150 and the optical transceivers 100 may be coupled to a support component 160, as shown; the support component 160 may include electrical and/or optical pathways (not shown) between the network switch 150 and the optical transceivers 100. In some embodiments, the network switch 150 may include one or more semiconductor dies, and the optical transceivers 100 may include one or more semiconductor dies (e.g., as discussed below with reference to FIGS. 5 and 6). In some embodiments, the support component 160 may include a semiconductor die, a semiconductor-based interposer, a glass-based interposer, an organic interposer, or an organic package substrate (e.g., as discussed below with reference to FIGS. 7-8). Although the optical transceivers 100 and the network switch 150 of FIG. 4 are shown on only one face of the support component 160, this is simply for ease of illustration, and components like the optical transceivers 100 and the network switch 150 (and other components that are part of the optoelectronic assembly 170, not shown) may be coupled to one or both faces of the support component 160.

In any of the embodiments disclosed herein, redundant SOAs may be present instead of or in addition to redundant lasers 116. For example, a multi-laser module 104, an optical transceiver 100, and/or an optoelectronic assembly 170 may include redundant SOAs.

The multi-laser modules 104, optical transceivers 100, and optoelectronic assemblies 170 disclosed herein may be included in any suitable electronic component. FIGS. 5-9 illustrate various examples of apparatuses that may include any of the multi-laser modules 104, optical transceivers 100, and/or optoelectronic assemblies 170 disclosed herein, or may be included in an electronic device that also includes any of the multi-laser modules 104, optical transceivers 100, and/or optoelectronic assemblies 170 disclosed herein.

Figure 5:
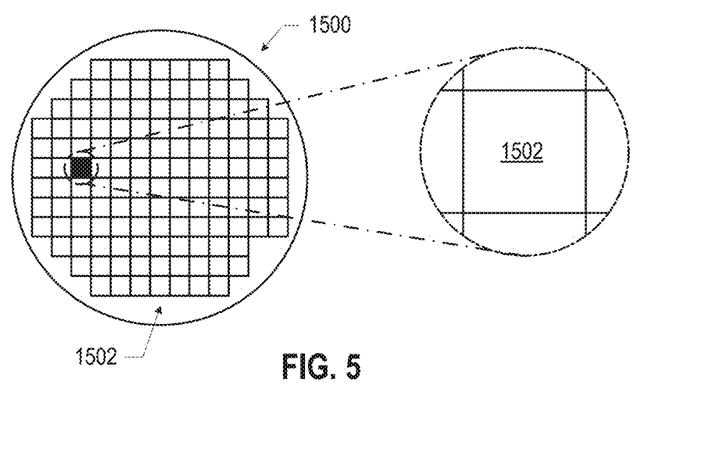
FIG. 5 is a top view of a wafer and dies that may include an optical transceiver with a multi-laser module in accordance with any of the embodiments disclosed herein.

FIG. 5 is a top view of a wafer 1500 and dies 1502 that may be part of any of the multi-laser modules 104, optical transceivers 100, and optoelectronic assemblies 170 disclosed herein. For example, a die 1502 may be part of an optical transceiver 100 or an optoelectronic assembly 170 (e.g., as part of the network switch 150 and/or as part of the support component 160). The wafer 1500 may be composed of semiconductor material and may include one or more dies 1502 having IC structures formed on a surface of the wafer 1500. Each of the dies 1502 may be a repeating unit of a semiconductor product that includes any suitable IC. After the fabrication of the semiconductor product is complete, the wafer 1500 may undergo a singulation process in which the dies 1502 are separated from one another to provide discrete "chips" of the semiconductor product. The die 1502 may include one or more transistors (e.g., some of the transistors 1640 of FIG. 6, discussed below) and/or supporting circuitry to route electrical signals to the transistors, as well as any other IC components. In some embodiments, the wafer 1500 or the die 1502 may include a memory device (e.g., a random access memory (RAM) device, such as a static RAM (SRAM) device, a magnetic RAM (MRAM) device, a resistive RAM (RRAM) device, a conductive-bridging RAM (CBRAM) device, etc.), a logic device (e.g., an AND, OR, NAND, or NOR gate), or any other suitable circuit element. Multiple ones of these devices may be combined on a single die 1502. For example, a memory array formed by multiple memory devices may be formed on a same die 1502 as a processing device (e.g., the processing device 1802 of FIG. 9) or other logic that is configured to store information in the memory devices or execute instructions stored in the memory array.

Figure 6:
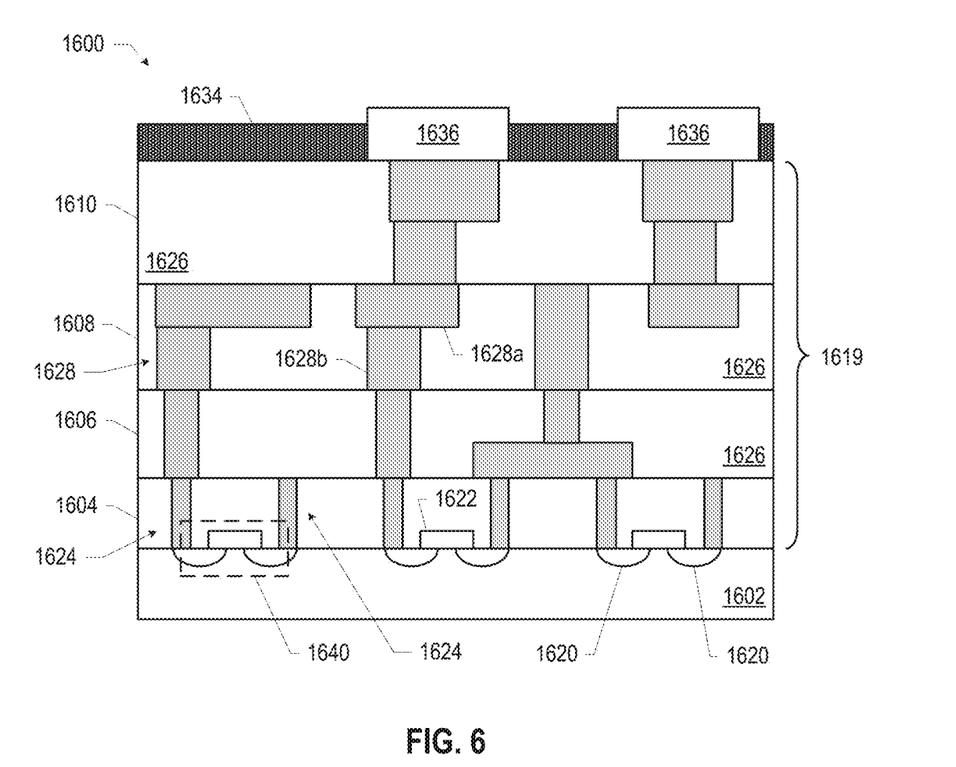
FIG. 6 is a side, cross-sectional view of an integrated circuit (IC) device that may include an optical transceiver with a multi-laser module, in accordance with any of the embodiments disclosed herein.

FIG. 6 is a side, cross-sectional view of an IC device 1600 that may be part of any of the multi-laser modules 104, optical transceivers 100, and/or optoelectronic assemblies 170 disclosed herein. For example, an IC device 1600 may provide the optical signal circuitry 102 and/or the switch control circuitry 122 of an optical transceiver 100. In another example, an IC device 1600 may be (or may be part of) a network switch 150 and/or a support component 160. One or more of the IC devices 1600 may be included in one or more dies 1502 (FIG. 5). The IC device 1600 may be formed on a substrate 1602 (e.g., the wafer 1500 of FIG. 5) and may be included in a die (e.g., the die 1502 of FIG. 5). The substrate 1602 may be a semiconductor substrate composed of semiconductor material systems including, for example, n-type or p-type materials systems (or a combination of both). The substrate 1602 may include, for example, a crystalline substrate formed using a bulk silicon or a silicon-on-insulator (SOI) substructure. In some embodiments, the substrate 1602 may be formed using alternative materials, which may or may not be combined with silicon, that include but are not limited to germanium, indium antimonide, lead telluride, indium arsenide, indium phosphide, gallium arsenide, or gallium antimonide. Further materials classified as group II-VI, III-V, or IV may also be used to form the substrate 1602. Although a few examples of materials from which the substrate 1602 may be formed are described here, any material that may serve as a foundation for an IC device 1600 may be used. The substrate 1602 may be part of a singulated die (e.g., the dies 1502 of FIG. 5) or a wafer (e.g., the wafer 1500 of FIG. 5).

The IC device 1600 may include one or more device layers 1604 disposed on the substrate 1602. The device layer 1604 may include features of one or more transistors 1640 (e.g., metal oxide semiconductor field-effect transistors (MOSFETs)) formed on the substrate 1602. The device layer 1604 may include, for example, one or more source and/or drain (S/D) regions 1620, a gate 1622 to control current flow in the transistors 1640 between the S/D regions 1620, and one or more S/D contacts 1624 to route electrical signals to/from the S/D regions 1620. The transistors 1640 may include additional features not depicted for the sake of clarity, such as device isolation regions, gate contacts, and the like. The transistors 1640 are not limited to the type and configuration depicted in FIG. 6 and may include a wide variety of other types and configurations such as, for example, planar transistors, non-planar transistors, or a combination of both. Planar transistors may include bipolar junction transistors (BJT), heterojunction bipolar transistors (HBT), or high-electron-mobility transistors (HEMT). Non-planar transistors may include FinFET transistors, such as double-gate transistors or tri-gate transistors, and wrap-around or all-around gate transistors, such as nanoribbon and nanowire transistors.

Each transistor 1640 may include a gate 1622 formed of at least two layers, a gate dielectric and a gate electrode. The gate dielectric may include one layer or a stack of layers. The one or more layers may include silicon oxide, silicon dioxide, silicon carbide, and/or a high-k dielectric material. The high-k dielectric material may include elements such as hafnium, silicon, oxygen, titanium, tantalum, lanthanum, aluminum, zirconium, barium, strontium, yttrium, lead, scandium, niobium, and zinc. Examples of high-k materials that may be used in the gate dielectric include, but are not limited to, hafnium oxide, hafnium silicon oxide, lanthanum oxide, lanthanum aluminum oxide, zirconium oxide, zirconium silicon oxide, tantalum oxide, titanium oxide, barium strontium titanium oxide, barium titanium oxide, strontium titanium oxide, yttrium oxide, aluminum oxide, lead scandium tantalum oxide, and lead zinc niobate. In some embodiments, an annealing process may be carried out on the gate dielectric to improve its quality when a high-k material is used.

The gate electrode may be formed on the gate dielectric and may include at least one p-type work function metal or n-type work function metal, depending on whether the transistor 1640 is to be a p-type metal oxide semiconductor (PMOS) or an n-type metal oxide semiconductor (NMOS) transistor. In some implementations, the gate electrode may consist of a stack of two or more metal layers, where one or more metal layers are work function metal layers and at least one metal layer is a fill metal layer. Further metal layers may be included for other purposes, such as a barrier layer. For a PMOS transistor, metals that may be used for the gate electrode include, but are not limited to, ruthenium, palladium, platinum, cobalt, nickel, conductive metal oxides (e.g., ruthenium oxide), and any of the metals discussed below with reference to an NMOS transistor (e.g., for work function tuning). For an NMOS transistor, metals that may be used for the gate electrode include, but are not limited to, hafnium, zirconium, titanium, tantalum, aluminum, alloys of these metals, carbides of these metals (e.g., hafnium carbide, zirconium carbide, titanium carbide, tantalum carbide, and aluminum carbide), and any of the metals discussed above with reference to a PMOS transistor (e.g., for work function tuning).

In some embodiments, when viewed as a cross-section of the transistor 1640 along the source-channel-drain direction, the gate electrode may consist of a U-shaped structure that includes a bottom portion substantially parallel to the surface of the substrate and two sidewall portions that are substantially perpendicular to the top surface of the substrate. In other embodiments, at least one of the metal layers that form the gate electrode may simply be a planar layer that is substantially parallel to the top surface of the substrate and does not include sidewall portions substantially perpendicular to the top surface of the substrate. In other embodiments, the gate electrode may consist of a combination of U-shaped structures and planar, non-U-shaped structures. For example, the gate electrode may consist of one or more U-shaped metal layers formed atop one or more planar, non-U-shaped layers.

In some embodiments, a pair of sidewall spacers may be formed on opposing sides of the gate stack to bracket the gate stack. The sidewall spacers may be formed from materials such as silicon nitride, silicon oxide, silicon carbide, silicon nitride doped with carbon, and silicon oxynitride. Processes for forming sidewall spacers are well known in the art and generally include deposition and etching process steps. In some embodiments, a plurality of spacer pairs may be used; for instance, two pairs, three pairs, or four pairs of sidewall spacers may be formed on opposing sides of the gate stack.

The S/D regions 1620 may be formed within the substrate 1602 adjacent to the gate 1622 of each transistor 1640. The S/D regions 1620 may be formed using an implantation/diffusion process or an etching/deposition process, for example. In the former process, dopants such as boron, aluminum, antimony, phosphorous, or arsenic may be ion-implanted into the substrate 1602 to form the S/D regions 1620. An annealing process that activates the dopants and causes them to diffuse farther into the substrate 1602 may follow the ion-implantation process. In the latter process, the substrate 1602 may first be etched to form recesses at the locations of the S/D regions 1620. An epitaxial deposition process may then be carried out to fill the recesses with material that is used to fabricate the S/D regions 1620. In some implementations, the S/D regions 1620 may be fabricated using a silicon alloy such as silicon germanium or silicon carbide. In some embodiments, the epitaxially deposited silicon alloy may be doped in situ with dopants such as boron, arsenic, or phosphorous. In some embodiments, the S/D regions 1620 may be formed using one or more alternate semiconductor materials such as germanium or a group III-V material or alloy. In further embodiments, one or more layers of metal and/or metal alloys may be used to form the S/D regions 1620.

Electrical signals, such as power and/or input/output (I/O) signals, may be routed to and/or from the devices (e.g., the transistors 1640) of the device layer 1604 through one or more interconnect layers disposed on the device layer 1604 (illustrated in FIG. 6 as interconnect layers 1606-1610). For example, electrically conductive features of the device layer 1604 (e.g., the gate 1622 and the S/D contacts 1624) may be electrically coupled with the interconnect structures 1628 of the interconnect layers 1606-1610. The one or more interconnect layers 1606-1610 may form a metallization stack (also referred to as an "ILD stack") 1619 of the IC device 1600.

The interconnect structures 1628 may be arranged within the interconnect layers 1606-1610 to route electrical signals according to a wide variety of designs (in particular, the arrangement is not limited to the particular configuration of interconnect structures 1628 depicted in FIG. 6). Although a particular number of interconnect layers 1606-1610 is depicted in FIG. 6, embodiments of the present disclosure include IC devices having more or fewer interconnect layers than depicted.

In some embodiments, the interconnect structures 1628 may include lines 1628a and/or vias 1628b filled with an electrically conductive material such as a metal. The lines 1628a may be arranged to route electrical signals in a direction of a plane that is substantially parallel with a surface of the substrate 1602 upon which the device layer 1604 is formed. For example, the lines 1628a may route electrical signals in a direction in and out of the page from the perspective of FIG. 6. The vias 1628b may be arranged to route electrical signals in a direction of a plane that is substantially perpendicular to the surface of the substrate 1602 upon which the device layer 1604 is formed. In some embodiments, the vias 1628b may electrically couple lines 1628a of different interconnect layers 1606-1610 together.

The interconnect layers 1606-1610 may include a dielectric material 1626 disposed between the interconnect structures 1628, as shown in FIG. 6. In some embodiments, the dielectric material 1626 disposed between the interconnect structures 1628 in different ones of the interconnect layers 1606-1610 may have different compositions; in other embodiments, the composition of the dielectric material 1626 between different interconnect layers 1606-1610 may be the same.

A first interconnect layer 1606 may be formed above the device layer 1604. In some embodiments, the first interconnect layer 1606 may include lines 1628a and/or vias 1628b, as shown. The lines 1628a of the first interconnect layer 1606 may be coupled with contacts (e.g., the S/D contacts 1624) of the device layer 1604.

A second interconnect layer 1608 may be formed above the first interconnect layer 1606. In some embodiments, the second interconnect layer 1608 may include vias 1628b to couple the lines 1628a of the second interconnect layer 1608 with the lines 1628a of the first interconnect layer 1606. Although the lines 1628a and the vias 1628b are structurally delineated with a line within each interconnect layer (e.g., within the second interconnect layer 1608) for the sake of clarity, the lines 1628a and the vias 1628b may be structurally and/or materially contiguous (e.g., simultaneously filled during a dual-damascene process) in some embodiments.

A third interconnect layer 1610 (and additional interconnect layers, as desired) may be formed in succession on the second interconnect layer 1608 according to similar techniques and configurations described in connection with the second interconnect layer 1608 or the first interconnect layer 1606. In some embodiments, the interconnect layers that are "higher up" in the metallization stack 1619 in the IC device 1600 (i.e., farther away from the device layer 1604) may be thicker.

The IC device 1600 may include a solder resist material 1634 (e.g., polyimide or similar material) and one or more conductive contacts 1636 formed on the interconnect layers 1606-1610. In FIG. 6, the conductive contacts 1636 are illustrated as taking the form of bond pads. The conductive contacts 1636 may be electrically coupled with the interconnect structures 1628 and configured to route the electrical signals of the transistor(s) 1640 to other external devices. For example, solder bonds may be formed on the one or more conductive contacts 1636 to mechanically and/or electrically couple a chip including the IC device 1600 with another component (e.g., a circuit board). The IC device 1600 may include additional or alternate structures to route the electrical signals from the interconnect layers 1606-1610; for example, the conductive contacts 1636 may include other analogous features (e.g., posts) that route the electrical signals to external components.

Figure 7:
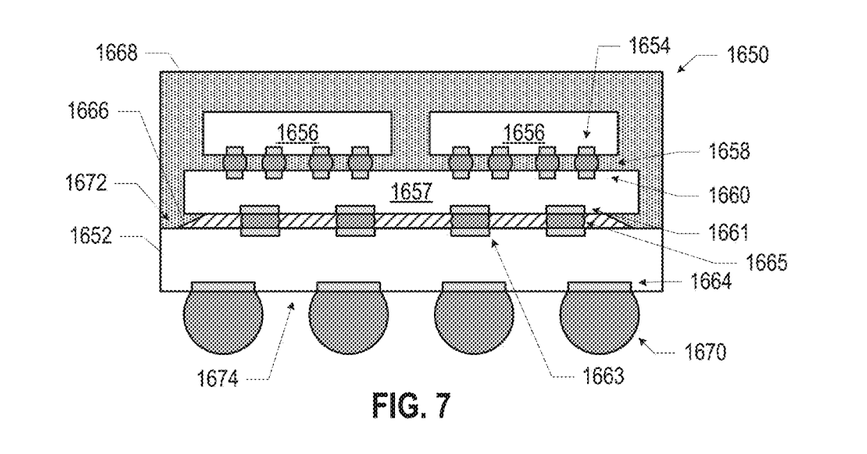
FIG. 7 is a side, cross-sectional view of an IC package that may include an optical transceiver with a multi-laser module in accordance with various embodiments.

FIG. 7 is a side, cross-sectional view of an example IC package 1650 that may include one or more multi-laser modules 104, optical transceivers 100, and/or optoelectronic assemblies 170. For example, in some embodiments, the dies 1656 may include the network switch 150 and the optical transceivers 100, while the interposer 1657 may be the support component 160 of an optoelectronic assembly 170. In another example, in some embodiments, the dies 1656 may include the network switch 150 and the optical transceivers 100, while the package substrate 1652 may be the support component 160 of an optoelectronic assembly 170. In some embodiments, the IC package 1650 may be a system-in-package (SiP). In some embodiments, the IC package 1650 may include a photonics IC (PIC) co-packaged with an IC package. In some embodiments, the IC package 1650 may include fully integrated electronic photonics ICs (EPICs).

The package substrate 1652 may be formed of a dielectric material (e.g., a ceramic, a buildup film, an epoxy film having filler particles therein, glass, an organic material, an inorganic material, combinations of organic and inorganic materials, embedded portions formed of different materials, etc.), and may have conductive pathways extending through the dielectric material between the face 1672 and the face 1674, or between different locations on the face 1672, and/or between different locations on the face 1674. These conductive pathways may take the form of any of the interconnects 1628 discussed above with reference to FIG. 6.

The package substrate 1652 may include conductive contacts 1663 that are coupled to conductive pathways (not shown) through the package substrate 1652, allowing circuitry within the dies 1656 and/or the interposer 1657 to electrically couple to various ones of the conductive contacts 1664 (or to other devices included in the package substrate 1652, not shown).

The IC package 1650 may include an interposer 1657 coupled to the package substrate 1652 via conductive contacts 1661 of the interposer 1657, first-level interconnects 1665, and the conductive contacts 1663 of the package substrate 1652. The first-level interconnects 1665 illustrated in FIG. 7 are solder bumps, but any suitable first-level interconnects 1665 may be used. In some embodiments, no interposer 1657 may be included in the IC package 1650; instead, the dies 1656 may be coupled directly to the conductive contacts 1663 at the face 1672 by first-level interconnects 1665. More generally, one or more dies 1656 may be coupled to the package substrate 1652 via any suitable structure (e.g., (e.g., a silicon bridge, an organic bridge, one or more waveguides, one or more interposers, wirebonds, etc.).

The IC package 1650 may include one or more dies 1656 coupled to the interposer 1657 via conductive contacts 1654 of the dies 1656, first-level interconnects 1658, and conductive contacts 1660 of the interposer 1657. The conductive contacts 1660 may be coupled to conductive pathways (not shown) through the interposer 1657, allowing circuitry within the dies 1656 to electrically couple to various ones of the conductive contacts 1661 (or to other devices included in the interposer 1657, not shown). The first-level interconnects 1658 illustrated in FIG. 7 are solder bumps, but any suitable first-level interconnects 1658 may be used. As used herein, a "conductive contact" may refer to a portion of conductive material (e.g., metal) serving as an interface between different components; conductive contacts may be recessed in, flush with, or extending away from a surface of a component, and may take any suitable form (e.g., a conductive pad or socket).

In some embodiments, an underfill material 1666 may be disposed between the package substrate 1652 and the interposer 1657 around the first-level interconnects 1665, and a mold compound 1668 may be disposed around the dies 1656 and the interposer 1657 and in contact with the package substrate 1652. In some embodiments, the underfill material 1666 may be the same as the mold compound 1668. Example materials that may be used for the underfill material 1666 and the mold compound 1668 are epoxy mold materials, as suitable. Second-level interconnects 1670 may be coupled to the conductive contacts 1664. The second-level interconnects 1670 illustrated in FIG. 7 are solder balls (e.g., for a ball grid array arrangement), but any suitable second-level interconnects 16770 may be used (e.g., pins in a pin grid array arrangement or lands in a land grid array arrangement). The second-level interconnects 1670 may be used to couple the IC package 1650 to another component, such as a circuit board (e.g., a motherboard), an interposer, or another IC package, as known in the art and as discussed below with reference to FIG. 8.

The dies 1656 may take the form of any of the embodiments of the die 1502 discussed herein (e.g., may include any of the embodiments of the IC device 1600). In embodiments in which the IC package 1650 includes multiple dies 1656, the IC package 1650 may be referred to as a multi-chip package (MCP). The dies 1656 may include circuitry to perform any desired functionality. For example, or more of the dies 1656 may be logic dies (e.g., silicon-based dies), and one or more of the dies 1656 may be memory dies (e.g., high bandwidth memory). In some embodiments, a die 1656 may include one or more multi-laser modules 104.

Although the IC package 1650 illustrated in FIG. 7 is a flip chip package, other package architectures may be used. For example, the IC package 1650 may be a ball grid array (BGA) package, such as an embedded wafer-level ball grid array (eWLB) package. In another example, the IC package 1650 may be a wafer-level chip scale package (WLCSP) or a panel fanout (FO) package. Although two dies 1656 are illustrated in the IC package 1650 of FIG. 7, an IC package 1650 may include any desired number of dies 1656. An IC package 1650 may include additional passive components, such as surface-mount resistors, capacitors, and inductors disposed on the first face 1672 or the second face 1674 of the package substrate 1652, or on either face of the interposer 1657. More generally, an IC package 1650 may include any other active or passive components known in the art.

Figure 8:
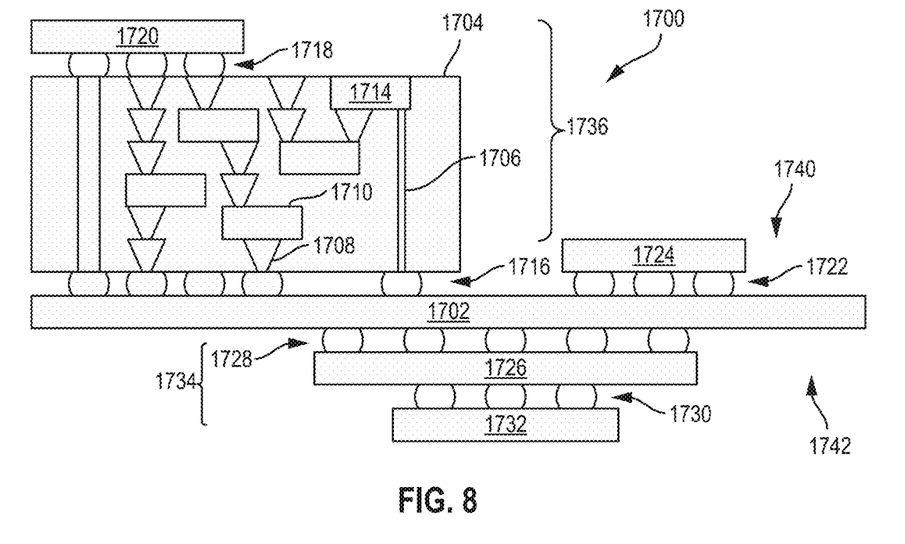
FIG. 8 is a side, cross-sectional view of an IC device assembly that may include an optical transceiver with a multi-laser module in accordance with any of the embodiments disclosed herein.

FIG. 8 is a side, cross-sectional view of an IC device assembly 1700 that may include one or more IC packages or other electronic components (e.g., a die) including one or more multi-laser modules 104, optical transceivers 100, and/or optoelectronic assemblies 170 in accordance with any of the embodiments disclosed herein. The IC device assembly 1700 includes a number of components disposed on a circuit board 1702 (which may be, e.g., a motherboard). The IC device assembly 1700 includes components disposed on a first face 1740 of the circuit board 1702 and an opposing second face 1742 of the circuit board 1702; generally, components may be disposed on one or both faces 1740 and 1742. Any of the IC packages discussed below with reference to the IC device assembly 1700 may take the form of any of the embodiments of the IC package 1650 discussed above with reference to FIG. 7.

In some embodiments, the circuit board 1702 may be a printed circuit board (PCB) including multiple metal layers separated from one another by layers of dielectric material and interconnected by electrically conductive vias. Any one or more of the metal layers may be formed in a desired circuit pattern to route electrical signals (optionally in conjunction with other metal layers) between the components coupled to the circuit board 1702. In other embodiments, the circuit board 1702 may be a non-PCB substrate.

The IC device assembly 1700 illustrated in FIG. 8 includes a package-on-interposer structure 1736 coupled to the first face 1740 of the circuit board 1702 by coupling components 1716. The coupling components 1716 may electrically and mechanically couple the package-on-interposer structure 1736 to the circuit board 1702, and may include solder balls (as shown in FIG. 8), male and female portions of a socket, an adhesive, an underfill material, and/or any other suitable electrical and/or mechanical coupling structure.

The package-on-interposer structure 1736 may include an IC package 1720 coupled to an package interposer 1704 by coupling components 1718. The coupling components 1718 may take any suitable form for the application, such as the forms discussed above with reference to the coupling components 1716. Although a single IC package 1720 is shown in FIG. 8, multiple IC packages may be coupled to the package interposer 1704; indeed, additional interposers may be coupled to the package interposer 1704. The package interposer 1704 may provide an intervening substrate used to bridge the circuit board 1702 and the IC package 1720. The IC package 1720 may be or include, for example, a die (the die 1502 of FIG. 5), an IC device (e.g., the IC device 1600 of FIG. 6), or any other suitable component. Generally, the package interposer 1704 may spread a connection to a wider pitch or reroute a connection to a different connection. For example, the package interposer 1704 may couple the IC package 1720 (e.g., a die) to a set of BGA conductive contacts of the coupling components 1716 for coupling to the circuit board 1702. In the embodiment illustrated in FIG. 8, the IC package 1720 and the circuit board 1702 are attached to opposing sides of the package interposer 1704; in other embodiments, the IC package 1720 and the circuit board 1702 may be attached to a same side of the package interposer 1704. In some embodiments, three or more components may be interconnected by way of the package interposer 1704.

In some embodiments, the package interposer 1704 may be formed as a PCB, including multiple metal layers separated from one another by layers of dielectric material and interconnected by electrically conductive vias. In some embodiments, the package interposer 1704 may be formed of an epoxy resin, a fiberglass-reinforced epoxy resin, an epoxy resin with inorganic fillers, a ceramic material, or a polymer material such as polyimide. In some embodiments, the package interposer 1704 may be formed of alternate rigid or flexible materials that may include the same materials described above for use in a semiconductor substrate, such as silicon, germanium, and other group III-V and group IV materials. The package interposer 1704 may include metal lines 1710 and vias 1708, including but not limited to through-silicon vias (TSVs) 1706. The package interposer 1704 may further include embedded devices 1714, including both passive and active devices. Such devices may include, but are not limited to, capacitors, decoupling capacitors, resistors, inductors, fuses, diodes, transformers, sensors, electrostatic discharge (ESD) devices, and memory devices. More complex devices such as radio frequency devices, power amplifiers, power management devices, antennas, arrays, sensors, and microelectromechanical systems (MEMS) devices may also be formed on the package interposer 1704. The package-on-interposer structure 1736 may take the form of any of the package-on-interposer structures known in the art. In some embodiments, the package interposer 1704 may include one or more multi-laser modules 104 (e.g., in an optical transceiver 100).

The IC device assembly 1700 may include an IC package 1724 coupled to the first face 1740 of the circuit board 1702 by coupling components 1722. The coupling components 1722 may take the form of any of the embodiments discussed above with reference to the coupling components 1716, and the IC package 1724 may take the form of any of the embodiments discussed above with reference to the IC package 1720.

The IC device assembly 1700 illustrated in FIG. 8 includes a package-on-package structure 1734 coupled to the second face 1742 of the circuit board 1702 by coupling components 1728. The package-on-package structure 1734 may include an IC package 1726 and an IC package 1732 coupled together by coupling components 1730 such that the IC package 1726 is disposed between the circuit board 1702 and the IC package 1732. The coupling components 1728 and 1730 may take the form of any of the embodiments of the coupling components 1716 discussed above, and the IC packages 1726 and 1732 may take the form of any of the embodiments of the IC package 1720 discussed above. The package-on-package structure 1734 may be configured in accordance with any of the package-on-package structures known in the art.

Figure 9:
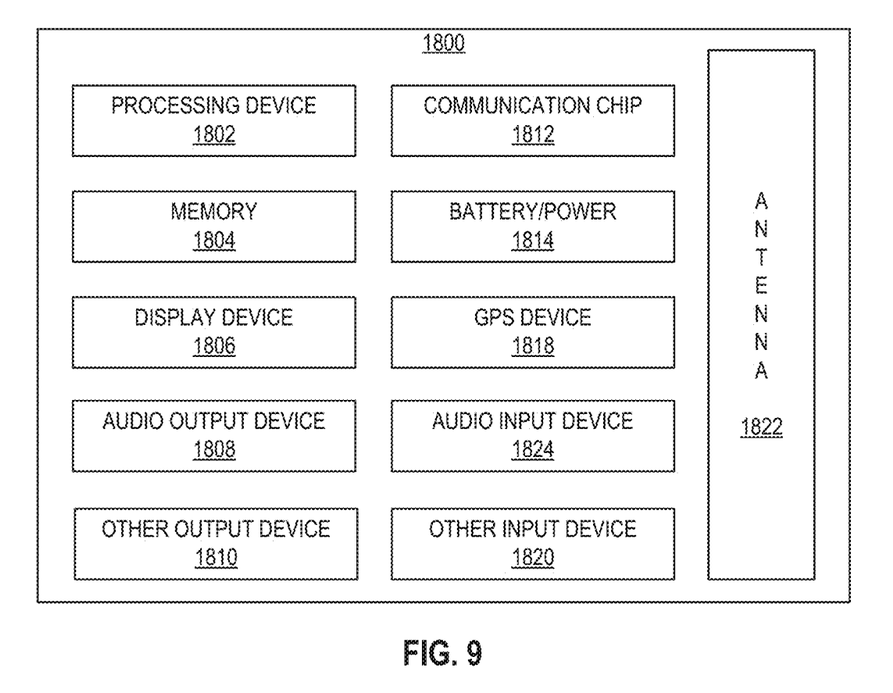
FIG. 9 is a block diagram of an example electrical device that may include an optical transceiver with a multi-laser module in accordance with any of the embodiments disclosed herein.

FIG. 9 is a block diagram of an example electrical device 1800 that may include one or more multi-laser modules 104, optical transceivers 100, and/or optoelectronic assemblies 170 in accordance with any of the embodiments disclosed herein. For example, any suitable ones of the components of the electrical device 1800 may include one or more of the IC device assemblies 1700, IC packages 1650, IC devices 1600, or dies 1502 disclosed herein. A number of components are illustrated in FIG. 9 as included in the electrical device 1800, but any one or more of these components may be omitted or duplicated, as suitable for the application. In some embodiments, some or all of the components included in the electrical device 1800 may be attached to one or more motherboards. In some embodiments, some or all of these components are fabricated onto a single system-on-a-chip (SoC) die.

Additionally, in various embodiments, the electrical device 1800 may not include one or more of the components illustrated in FIG. 9, but the electrical device 1800 may include interface circuitry for coupling to the one or more components. For example, the electrical device 1800 may not include a display device 1806, but may include display device interface circuitry (e.g., a connector and driver circuitry) to which a display device 1806 may be coupled. In another set of examples, the electrical device 1800 may not include an audio input device 1824 or an audio output device 1808, but may include audio input or output device interface circuitry (e.g., connectors and supporting circuitry) to which an audio input device 1824 or audio output device 1808 may be coupled.

The electrical device 1800 may include a processing device 1802 (e.g., one or more processing devices). As used herein, the term "processing device" or "processor" may refer to any device or portion of a device that processes electronic data from registers and/or memory to transform that electronic data into other electronic data that may be stored in registers and/or memory. The processing device 1802 may include one or more digital signal processors (DSPs), application-specific integrated circuits (ASICs), central processing units (CPUs), graphics processing units (GPUs), cryptoprocessors (specialized processors that execute cryptographic algorithms within hardware), server processors, or any other suitable processing devices. The electrical device 1800 may include a memory 1804, which may itself include one or more memory devices such as volatile memory (e.g., dynamic random access memory (DRAM)), nonvolatile memory (e.g., read-only memory (ROM)), flash memory, solid state memory, and/or a hard drive. In some embodiments, the memory 1804 may include memory that shares a die with the processing device 1802. This memory may be used as cache memory and may include embedded dynamic random access memory (eDRAM) or spin transfer torque magnetic random access memory (STT-MRAM).

In some embodiments, the electrical device 1800 may include a communication chip 1812 (e.g., one or more communication chips). For example, the communication chip 1812 may be configured for managing wireless communications for the transfer of data to and from the electrical device 1800. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not.

The communication chip 1812 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication chip 1812 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chip 1812 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 1812 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 1812 may operate in accordance with other wireless protocols in other embodiments. The electrical device 1800 may include an antenna 1822 to facilitate wireless communications and/or to receive other wireless communications (such as AM or FM radio transmissions).

In some embodiments, the communication chip 1812 may manage wired communications, such as electrical, optical, or any other suitable communication protocols (e.g., Ethernet). As noted above, the communication chip 1812 may include multiple communication chips. For instance, a first communication chip 1812 may be dedicated to shorter-range wireless communications such as Wi-Fi or Bluetooth, and a second communication chip 1812 may be dedicated to longer-range wireless communications such as global positioning system (GPS), EDGE, GPRS, CDMA, WiMAX, LTE, EV-DO, or others. In some embodiments, a first communication chip 1812 may be dedicated to wireless communications, and a second communication chip 1812 may be dedicated to wired communications.

The electrical device 1800 may include battery/power circuitry 1814. The battery/power circuitry 1814 may include one or more energy storage devices (e.g., batteries or capacitors) and/or circuitry for coupling components of the electrical device 1800 to an energy source separate from the electrical device 1800 (e.g., AC line power).

The electrical device 1800 may include a display device 1806 (or corresponding interface circuitry, as discussed above). The display device 1806 may include any visual indicators, such as a heads-up display, a computer monitor, a projector, a touchscreen display, a liquid crystal display (LCD), a light-emitting diode display, or a flat panel display.

The electrical device 1800 may include an audio output device 1808 (or corresponding interface circuitry, as discussed above). The audio output device 1808 may include any device that generates an audible indicator, such as speakers, headsets, or earbuds.

The electrical device 1800 may include an audio input device 1824 (or corresponding interface circuitry, as discussed above). The audio input device 1824 may include any device that generates a signal representative of a sound, such as microphones, microphone arrays, or digital instruments (e.g., instruments having a musical instrument digital interface (MIDI) output).

The electrical device 1800 may include a GPS device 1818 (or corresponding interface circuitry, as discussed above). The GPS device 1818 may be in communication with a satellite-based system and may receive a location of the electrical device 1800, as known in the art.

The electrical device 1800 may include an other output device 1810 (or corresponding interface circuitry, as discussed above). Examples of the other output device 1810 may include an audio codec, a video codec, a printer, a wired or wireless transmitter for providing information to other devices, or an additional storage device.

The electrical device 1800 may include an other input device 1820 (or corresponding interface circuitry, as discussed above). Examples of the other input device 1820 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

The electrical device 1800 may have any desired form factor, such as a handheld or mobile electrical device (e.g., a cell phone, a smart phone, a mobile internet device, a music player, a tablet computer, a laptop computer, a netbook computer, an ultrabook computer, a personal digital assistant (PDA), an ultra mobile personal computer, etc.), a desktop electrical device, a server device or other networked computing component, a printer, a scanner, a monitor, a set-top box, an entertainment control unit, a vehicle control unit, a digital camera, a digital video recorder, or a wearable electrical device. In some embodiments, the electrical device 1800 may be any other electronic device that processes data.

The following paragraphs provide various examples of the embodiments disclosed herein.

Example 1 is an optical transceiver, including: a plurality of lasers including a first laser and a second laser; modulator circuitry; and switching circuitry coupled between the plurality of lasers and the modulator circuitry, wherein the switching circuitry is controllable to selectively couple an output of the first laser to the modulator circuitry or an output of the second laser to the modulator circuitry.

Example 2 includes the subject matter of Example 1, and further specifies that the first laser includes indium and phosphorous.

Example 3 includes the subject matter of any of Examples 1-2, and further specifies that the switching circuitry is to couple the output of the first laser to the modulator circuitry and, upon (1) detection of a power of the first laser falling below a threshold or (2) detection of a bias current exceeding a predetermined limit, to couple the output of the second laser to the modulator circuitry.

Example 4 includes the subject matter of any of Examples 1-3, and further specifies that the plurality of lasers is a first plurality of lasers, the modulator circuitry is first modulator circuitry, the switching circuitry is first switching circuitry, and the optical transceiver further includes: a second plurality of lasers including a third laser and a fourth laser; second modulator circuitry; and second switching circuitry coupled between the second plurality of lasers and the second modulator circuitry, wherein the second switching circuitry is controllable to selectively couple an output of the third laser to the second modulator circuitry or an output of the fourth laser to the second modulator circuitry.

Example 5 includes the subject matter of Example 4, and further specifies that the second laser is spatially between the first laser and the third laser, and wherein the third laser is spatially between the second laser and the fourth laser.

Example 6 includes the subject matter of any of Examples 1-5, and further specifies that the modulator circuitry includes multiplexer circuitry.

Example 7 includes the subject matter of any of Examples 1-6, and further specifies that the switching circuitry includes a Mach-Zehnder switch.

Example 8 includes the subject matter of any of Examples 1-7, and further specifies that the switching circuitry includes multiple switches.

Example 9 includes the subject matter of any of Examples 1-8, and further specifies that the first laser is a hybrid silicon laser.

Example 10 includes the subject matter of any of Examples 1-9, and further specifies that the plurality of lasers is a first plurality of lasers, the modulator circuitry is first modulator circuitry, the switching circuitry is first switching circuitry, and the optical transceiver further includes: a second plurality of lasers including a third laser; and second modulator circuitry, wherein an output of the third laser is coupled to the second modulator circuitry without intervening switching circuitry.

Example 11 includes the subject matter of any of Examples 1-10, and further specifies that the optical transceiver includes indium phosphide bonded to silicon.

Example 12 includes the subject matter of any of Examples 1-11, and further specifies that the optical transceiver is co-packaged with a network switch.

Example 13 includes the subject matter of any of Examples 1-12, and further includes: a photodetector.

Example 14 includes the subject matter of any of Examples 1-13, and further includes: a fiber optic cable connector.

Example 15 includes the subject matter of any of Examples 1-14, and further specifies that the optical transceiver is co-packaged with a plurality of other optical transceivers.

Example 16 is an optical transceiver, including: a first laser and a second laser; an optical output path; and switching circuitry to selectively couple an output of the first laser to the optical output path or an output of the second laser to the optical output path.

Example 17 includes the subject matter of Example 16, and further specifies that the first laser includes indium and phosphorous.

Example 18 includes the subject matter of any of Examples 16-17, and further specifies that the switching circuitry is to couple the output of the first laser to the optical output path and, upon (1) detection of a power of the first laser falling below a threshold or (2) detection of a bias current exceeding a predetermined limit, to couple the output of the second laser to the optical output path.

Example 19 includes the subject matter of any of Examples 16-18, and further specifies that the optical output path is a first optical output path, the switching circuitry is first switching circuitry, and the optical transceiver further includes: a third laser and a fourth laser; a second optical output path; and second switching circuitry to selectively couple an output of the third laser to the second optical output path or an output of the fourth laser to the second optical output path.

Example 20 includes the subject matter of Example 19, and further specifies that the second laser is spatially between the first laser and the third laser, and wherein the third laser is spatially between the second laser and the fourth laser.

Example 21 includes the subject matter of any of Examples 16-20, and further specifies that the optical output path includes multiplexer circuitry.

Example 22 includes the subject matter of any of Examples 16-21, and further specifies that the switching circuitry includes a Mach-Zehnder switch.

Example 23 includes the subject matter of any of Examples 16-22, and further specifies that the switching circuitry includes multiple switches.

Example 24 includes the subject matter of any of Examples 16-23, and further specifies that the first laser is a hybrid silicon laser.

Example 25 includes the subject matter of any of Examples 16-24, and further specifies that the optical output path is a first optical output path, the switching circuitry is first switching circuitry, and the optical transceiver further includes: a third laser; and a second optical output path, wherein an output of the third laser is coupled to the second optical output path without intervening switching circuitry.

Example 26 includes the subject matter of any of Examples 16-25, and further specifies that the optical transceiver includes indium phosphide bonded to silicon.

Example 27 includes the subject matter of any of Examples 16-26, and further specifies that the optical transceiver is co-packaged with a network switch.

Example 28 includes the subject matter of any of Examples 16-27, and further includes: a photodetector.

Example 29 includes the subject matter of any of Examples 16-28, and further includes: a fiber optic cable connector.

Example 30 includes the subject matter of any of Examples 16-29, and further specifies that the optical transceiver is co-packaged with a plurality of other optical transceivers.

Example 31 is an optoelectronic assembly, including an optical transceiver, including: a first laser and a second laser, an optical output path, wherein an output of the first laser is coupled to the optical output path, and switching circuitry to decouple the output of the first laser from the optical output path and to couple an output of the second laser to the optical output path; and a network switch.

Example 32 includes the subject matter of Example 31, and further specifies that the first laser includes indium and phosphorous.

Example 33 includes the subject matter of any of Examples 31-32, and further specifies that the switching circuitry is to couple the output of the first laser to the optical output path and, upon (1) detection of a power of the first laser falling below a threshold or (2) detection of a bias current exceeding a predetermined limit, to couple the output of the second laser to the optical output path.

Example 34 includes the subject matter of any of Examples 31-33, and further specifies that the optical output path is a first optical output path, the switching circuitry is first switching circuitry, and the optical transceiver further includes: a third laser and a fourth laser; a second optical output path; and second switching circuitry to selectively couple an output of the third laser to the second optical output path or an output of the fourth laser to the second optical output path.

Example 35 includes the subject matter of Example 34, and further specifies that the second laser is spatially between the first laser and the third laser, and wherein the third laser is spatially between the second laser and the fourth laser.

Example 36 includes the subject matter of any of Examples 31-35, and further specifies that the optical output path includes multiplexer circuitry.

Example 37 includes the subject matter of any of Examples 31-36, and further specifies that the switching circuitry includes a Mach-Zehnder switch.

Example 38 includes the subject matter of any of Examples 31-37, and further specifies that the switching circuitry includes multiple switches.

Example 39 includes the subject matter of any of Examples 31-38, and further specifies that the first laser is a hybrid silicon laser.

Example 40 includes the subject matter of any of Examples 31-39, and further specifies that the optical output path is a first optical output path, the switching circuitry is first switching circuitry, and the optical transceiver further includes: a third laser; and a second optical output path, wherein an output of the third laser is coupled to the second optical output path without intervening switching circuitry.

Example 41 includes the subject matter of any of Examples 31-40, and further specifies that the optical transceiver includes indium phosphide bonded to silicon.

Example 42 includes the subject matter of any of Examples 31-41, and further specifies that the optical transceiver and the network switch are coupled to a support component.

Example 43 includes the subject matter of Example 42, and further specifies that the support component includes silicon.

Example 44 includes the subject matter of any of Examples 42-43, and further specifies that the support component includes a package substrate.

Example 45 includes the subject matter of any of Examples 31-44, and further specifies that the optical transceiver further includes: a photodetector.

Example 46 includes the subject matter of any of Examples 31-45, and further specifies that the optoelectronic assembly further includes: a fiber optic cable connector.

Example 47 includes the subject matter of any of Examples 31-46, and further specifies that the optical transceiver is one of a plurality of optical transceivers in the optoelectronic assembly.

Example 48 includes the subject matter of Example 47, and further specifies that the plurality of optical transceivers and the network switch are coupled to a support component.

Example 49 includes the subject matter of any of Examples 1-48, and further includes redundant semiconductor optical amplifiers (SOAs).

The invention claimed is:
1. An optical transceiver, comprising:
a semiconductor die, comprising:
a first laser, a second laser, a third laser, and a fourth laser,
an optical output path,
modulator circuitry, and
switching circuitry, comprising one or more multiplexers, to selectively couple one of an output of the second laser, an output of the third laser, or an output of the fourth laser to the optical output path when the first laser fails.
2. The optical transceiver of claim 1, wherein at least one of the first laser, the second laser, the third laser, and the fourth laser includes indium and phosphorous.
3. The optical transceiver of claim 1, further comprising flip chip bond pads.
4. The optical transceiver of claim 1, further comprising a photodetector.
5. The optical transceiver of claim 1, wherein the one or more multiplexers include one or more switches.
6. The optical transceiver of claim 1, wherein the switching circuitry is to couple the output of the first laser to the optical output path and, upon detection of a power of the first laser falling below a threshold, to couple the one of the output of the second laser, the output of the third laser, or the output of the fourth laser to the optical output path.
7. The optical transceiver of claim 1, wherein the switching circuitry includes a Mach-Zehnder switch.
8. The optical transceiver of claim 1, wherein the switching circuitry is to couple the output of the first laser to the optical output path and, upon detection of a bias current exceeding a predetermined limit, to couple the one of the output of the second laser, the output of the third laser, or the output of the fourth laser to the optical output path.
9. The optical transceiver of claim 1, further comprising a support component, wherein the semiconductor die is coupled to the support component.
10. The optical transceiver of claim 9, wherein the support component is an interposer or a package substrate.
11. The optical transceiver of claim 9, wherein the support component includes silicon.
12. The optical transceiver of claim 9, further comprising a network switch coupled to the support component.
13. The optical transceiver of claim 1, further comprising a fiber optic cable connector coupled to the optical output path.
14. The optical transceiver of claim 1, further comprising a multi-laser module, an output path, and an input path, wherein:
the multi-laser module includes the first laser, the second laser, the third laser, and the fourth laser,
the output path includes the multi-laser module and the modulator circuitry, and
the input path includes detector circuitry.
15. The optical transceiver of claim 14, wherein the input path further includes demodulator circuitry.
16. The optical transceiver of claim 15, further comprising optical signal circuitry coupled to the multi-laser module.
17. The optical transceiver of claim 16, wherein the optical signal circuitry is further coupled to the modulator circuitry.
18. The optical transceiver of claim 17, wherein the optical signal circuitry is further coupled to the detector circuitry.
19. The optical transceiver of claim 18, wherein the optical signal circuitry is further coupled to the demodulator circuitry.
20. The optical transceiver of claim 14, further comprising optical signal circuitry coupled to the multi-laser module and the modulator circuitry.
21. The optical transceiver of claim 20, wherein the optical signal circuitry is further coupled to the detector circuitry.
22. An optical transceiver, comprising:
a die, comprising:
a first laser, a second laser, a third laser, and a fourth laser,
an optical output path, and
switching circuitry, comprising one or more multiplexers, to selectively couple one of an output of the first laser, an output of the second laser, an output of the third laser, or an output of the fourth laser to the optical output path.
23. The optical transceiver of claim 22, wherein the optical output path is a first optical output path, the switching circuitry is first switching circuitry, and the optical transceiver further includes:
a second optical output path; and
second switching circuitry, to selectively couple the output of the third laser to the second optical output path or the output of the fourth laser to the second optical output path.
24. The optical transceiver of claim 23, wherein the second laser is spatially between the first laser and the third laser, and wherein the third laser is spatially between the second laser and the fourth laser.
25. The optical transceiver of claim 22, further comprising flip chip bond pads.
26. The optical transceiver of claim 22, further comprising a photodetector.
27. The optical transceiver of claim 22, wherein the switching circuitry is to couple the output of the first laser to the optical output path and, upon detection of a power of the first laser falling below a threshold, to couple the output of the second laser to the optical output path.

28. The optical transceiver of claim 22, wherein the switching circuitry is to selectively couple the output of the first laser to the optical output path or the output of the second laser to the optical output path.

29. The optical transceiver of claim 22, wherein the die further includes at least one of: modulator circuitry, optical signal circuitry, demodulator circuitry, or detector circuitry.

30. The optical transceiver of claim 22, wherein the switching circuitry is to couple the output of the first laser to the optical output path and, upon detection of a bias current exceeding a predetermined limit, to couple the one of the output of the second laser, the output of the third laser, or the output of the fourth laser to the optical output path.

31. The optical transceiver of claim 22, further comprising a support component, wherein the die is coupled to the support component.

32. The optical transceiver of claim 31, wherein the support component is an interposer or a package substrate.

33. The optical transceiver of claim 31, wherein the support component includes silicon.

34. The optical transceiver of claim 31, further comprising a network switch coupled to the support component.

35. The optical transceiver of claim 22, further comprising a fiber optic cable connector coupled to the optical output path.

36. The optical transceiver of claim 22, wherein the die is a semiconductor die.

37. An optical transceiver, comprising:
   a die, comprising:
      a first laser, a second laser, a third laser, and a fourth laser,
      a first optical output path,
      a second optical output path,
      first switching circuitry to selectively couple an output of the first laser to the first optical output path or an output of the second laser to the first optical output path, and
      second switching circuitry, to selectively couple an output of the third laser to the second optical output path or an output of the fourth laser to the second optical output path.

38. The optical transceiver of claim 37, wherein the second laser is spatially between the first laser and the third laser.

39. The optical transceiver of claim 38, wherein the third laser is spatially between the second laser and the fourth laser.

* * * * *